June 7, 1960  R. W. KRAMER  2,939,539
IMPLEMENT CONTROL MEANS
Filed Nov. 15, 1957  3 Sheets-Sheet 3
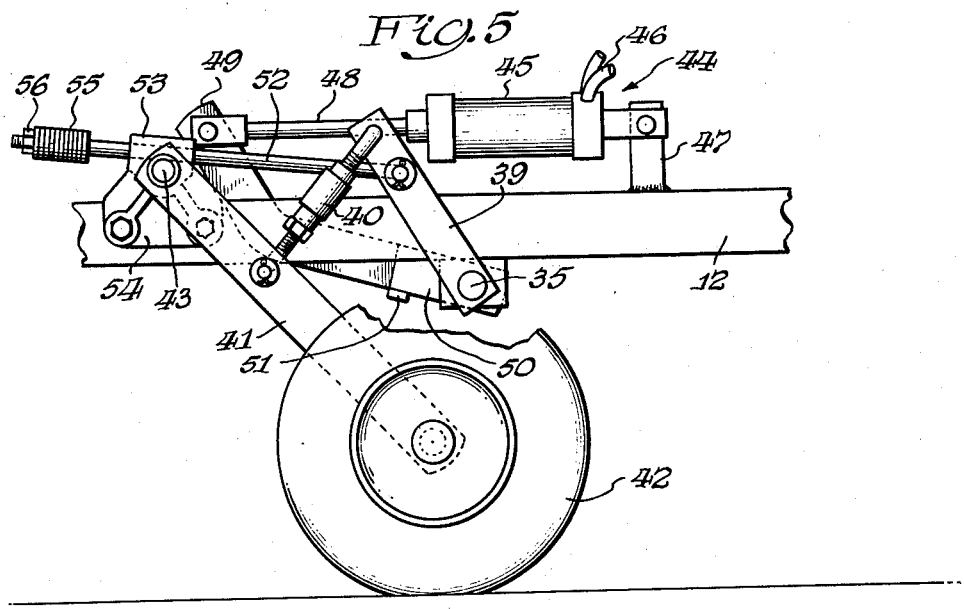
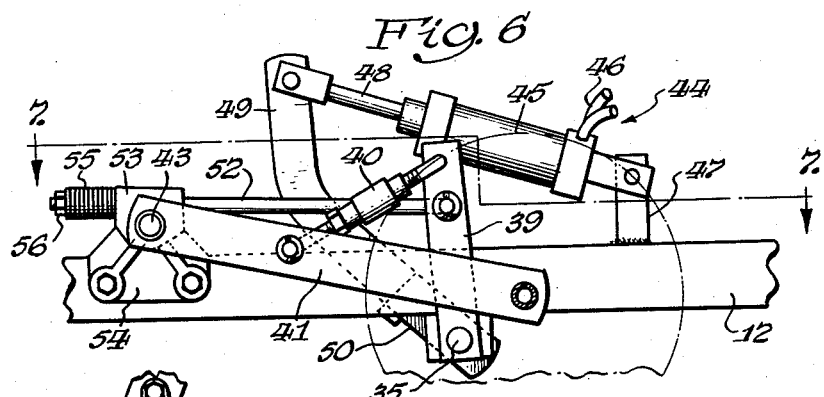
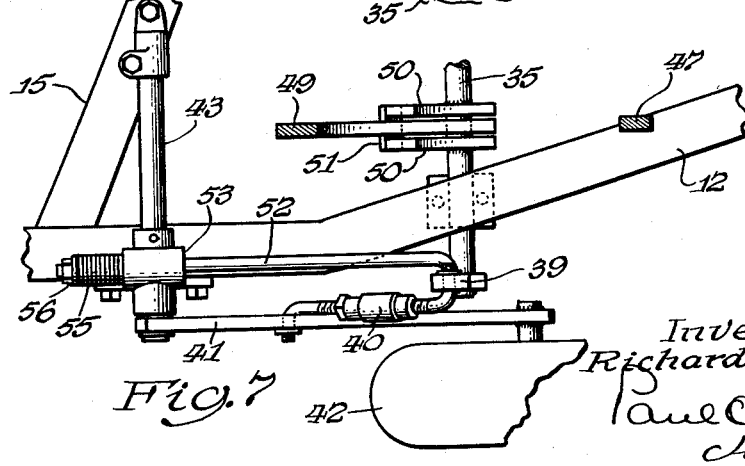
Inventor
Richard W. Kramer
Paul O. Pippel
Attorney

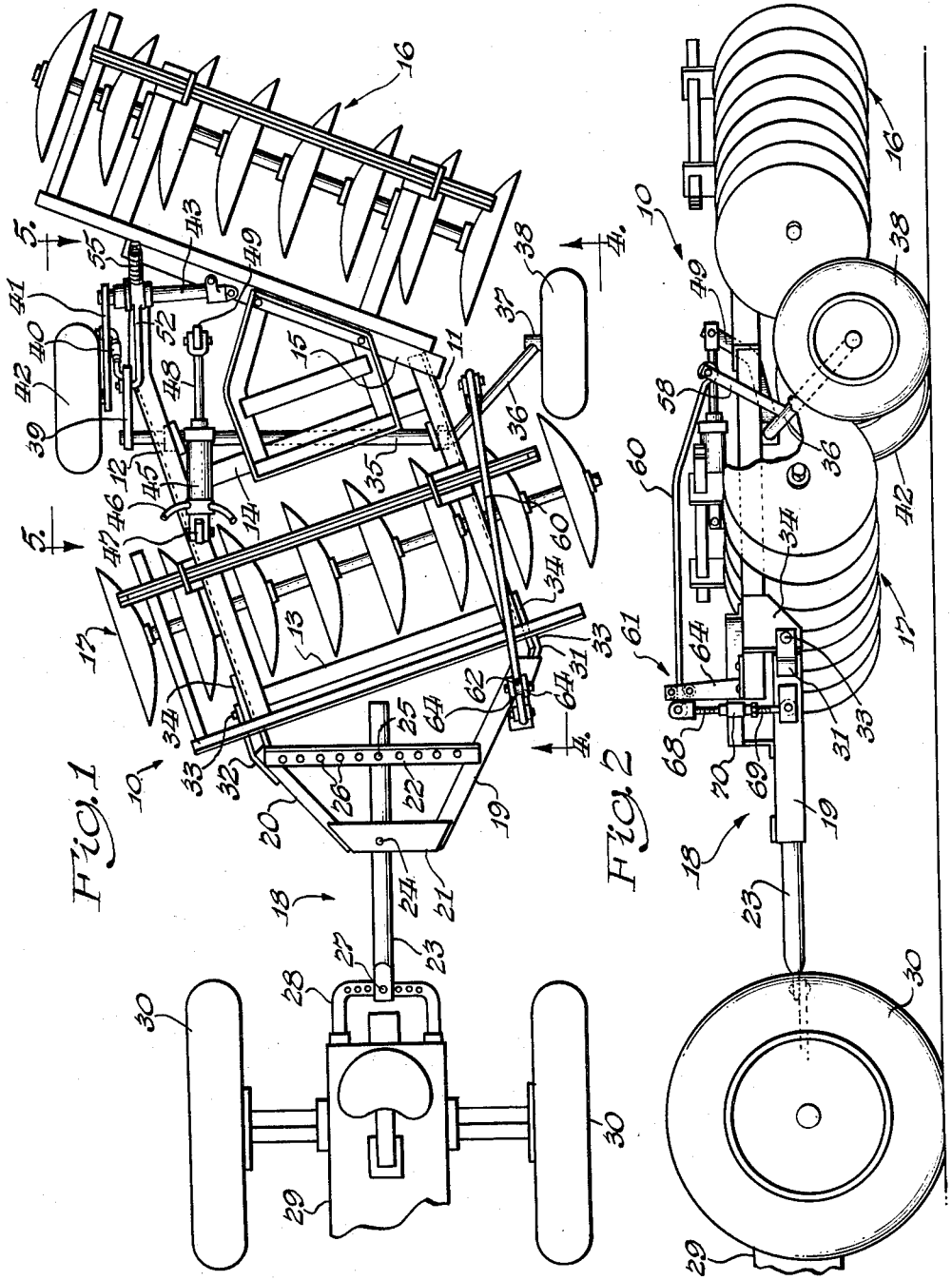

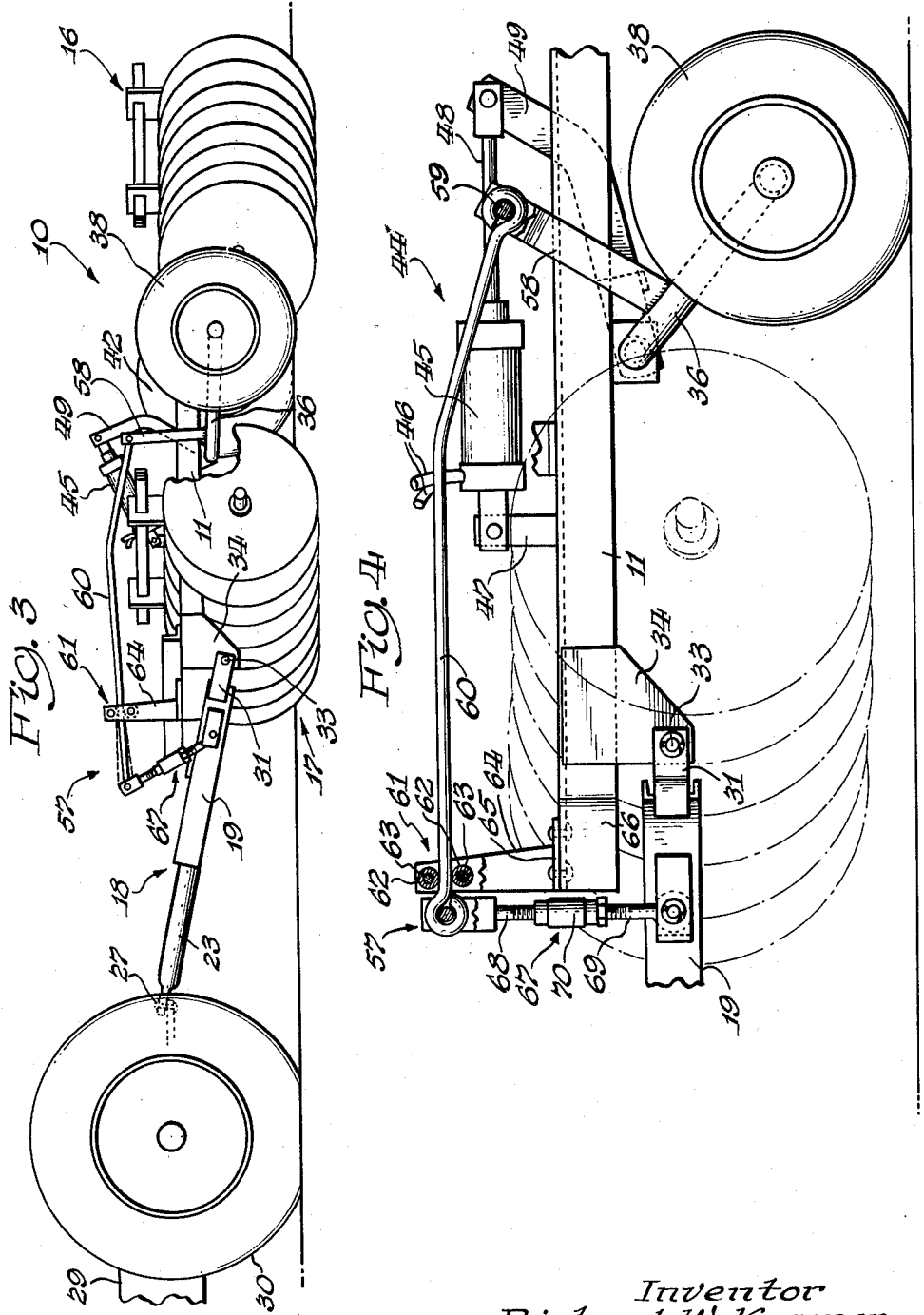

United States Patent Office 2,939,539
Patented June 7, 1960

2,939,539

IMPLEMENT CONTROL MEANS

Richard W. Kramer, Modesto, Calif., assignor to International Harvester Company, Chicago, Ill., a corporation of New Jersey Filed Nov. 15, 1957, Ser. No. 696,705

8 Claims. (Cl. 172—396)

This invention relates to agricultural implements and particularly to stabilizing apparatus therefor. More specifically the invention concerns a disk harrow of the wheel-controlled type, and has for its object the provision of novel means for holding an implement substantially level on its ground wheels during transportation thereof, while accommodating free floating of the implement during operation.

Another object of the invention is the provision, in an implement such as a wheeled disk harrow having a pivoted hitch permitting the implement to float and the harrow gangs to follow the ground contour, of stabilizing means automatically operative upon raising the implement to transport position to hold the implement substantially rigid and the harrow gangs level.

Another object of the invention is the provision of a stabilizer for an implement such as a wheel-controlled disk harrow having a tool frame pivoted to a hitch frame to allow tandem disk gangs to follow the ground contour, wherein a flexible rod operatively connected to the wheels for longitudinal shifting with the raising and lowering of the wheels, has its forward end connected to the hitch frame, and abutment means on the tool frame engaging the rod to provide a fulcrum support therefor in a vertical plane and an overhang at its forward end in the operating position of the implement which flexes and accommodates pivoting of the hitch frame, the rod being translationally shiftable rearwardly with the raising of the implement to a position where there is substantially no overhang and the connection of the hitch frame to the tool frame becomes rigid.

Other objects and advantages of the invention will become clear from the following detailed description when read in conjunction with the accompanying drawings wherein:

Figure 1 is a plan view of an offset disk harrow embodying the features of this invention, and illustrating the transport position thereof;

Figure 2 is a view in side elevation of the structure shown in Figure 1;

Figure 3 is a view similar to Figure 2 showing the positions of the parts in the operating position of the implement;

Figure 4 is an enlarged sectional detail taken on the line 4—4 of Figure 1;

Figure 5 is a section taken on the line 5—5 of Figure 1;

Figure 6 is a detail showing the lifting apparatus for the implement; and

Figure 7 is a sectional view taken on the line 7—7 of Figure 6.

In the drawings, the numeral 10 designates the tool-carrying frame of a wheel-controlled offset disk harrow, comprising side frame members 11 and 12 connected by a front brace or spacer 13, a central brace 14 and a rear brace 15, the latter angled relative to the other braces, as indicated in Figure 1, to provide a mounting for the rear disk gang unit 16 in tandem and angled relation to the front gang 17.

The offset disk harrow of this invention also includes a hitch frame 18 formed of a pair of laterally spaced rearwardly diverging bars 19 and 20, the latter being shorter than the former, connected by transverse braces 21 and 22 to which a longitudinally extending draft bar 23 is secured by pins 24 and 25, the latter pin being receivable in a selected one of a plurality of openings 26 provided in the bar 22 in order to angle the draft bar 23 relative to the implement as a whole. The forward end of draft bar 23 is connected by a pivot pin 27 to the drawbar 28 of a tractor 29 having laterally spaced rear drive wheels 30.

Bars 19 and 20 of hitch frame 18 have secured to the rearward ends thereof clevises 31 and 32, each of which is pivotally connected by a pivot pin 33 to the lower end of a bracket 34 affixed to and depending from the forward ends of the side frame members 11 and 12 of the tool-carrying frame 10. Hitch frame 18 is thus capable of vertical swinging relative to tool frame 10 about the axes of pivot pins 33.

The implement of this invention is a wheel-controlled harrow, and the selected angular relationship of the disk gang units 16 and 17 remains the same in operation as well as in transport position, the tool-carrying frame being elevated above the ground. A transversely extending shaft 35 is mounted in suitable bearings carried by the frame members 11 and 12, and one end thereof is bent to form a crank arm 36, to the end of which is secured a stub axle 37 upon which is mounted a ground engaging wheel 38. The other end of shaft 35 projects laterally beyond frame bar 12 and has affixed to its end an arm 39, the outer end of which is pivotally connected to one end of a link in the form of a turnbuckle 40 for adjusting the length thereof. The other end of link 40 is pivotally connected to an arm 41 which extends downwardly and forwardly and has mounted thereon another ground engaging wheel 42. Arm 41 is pivotally mounted upon one end of a shaft 43, the other end of which is secured to the rear frame bar 15.

It will thus be seen that by rocking shaft 35, crank arm 36 will swing in a vertical plane relative to the tool-carrying frame 10 to vertically move wheel 38 relative to the tool frame. Also, by virtue of the connection of link 40 to wheel-supporting arm 41, the latter arm likewise swings vertically carrying with it ground engaging wheel 42 to raise and lower the tool-carrying frame relative to the wheels 38 and 42.

Relative vertical movement of wheels 38 and 42 to raise and lower the implement between the transport and operating positions of Figures 2 and 3 is accomplished by any suitable means such as a hydraulic ram 44 comprising a cylinder 45 receiving fluid under pressure from a suitable source, not shown, on the tractor 29, through flexible hose lines 46. Cylinder 45 is pivotally anchored to a lug 47 and a piston rod 48 slidable therein is pivotally connected to the free end of a rearwardly and upwardly extending arm 49 pivotally mounted on shaft 35. Arm 49 is disposed between a pair of lugs 50 affixed to shaft 35 and having their projecting ends connected by a stop plate 51 affixed to the lower edges thereof.

As viewed in Figures 2, 3 and 4, extension of the piston rod 48 in cylinder 45, by virtue of the engagement of arm 49 with stop 51, rocks the shaft 35 in a clockwise direction to vertically move the implement relative to wheels 38 and 42 from the operating position of Figure 3 to the inoperative position of Figure 2. Upon retraction of the piston rod in the cylinder the weight of the implement returns it to operating position.

The operating depth of the implement is regulated by the provision of a rod 52 pivotally connected at one end to arm 39 and slidably receivable in a swivel 53 pivotally mounted on shaft 43, the outer end of which is supported by a bracket 54 secured to tool carrier frame bar 12.

A plurality of loose washers 55 engage swivel 53 and are in turn engaged by a nut 56 on the threaded rear end of bar 52. The operating position of wheels 38 and 42 relative to tool-carrying frame 10 can be adjusted by advancing and retracting nut 53 on the threaded end of rod 52, and by the number of washers 55 mounted on the rod. Adjustment of the vertical position of wheel 42 relative to wheel 38 to laterally level the implement can be accomplished by means of lengthening or shortening the turnbuckle link 40.

It is desirable that an implement of this type be allowed to float relative to the propelling vehicle during operation to permit the disk gangs to follow the contour of the ground. However, upon raising the implement to transport position on the ground wheels 38 and 42, the tendency of the implement to rock about these wheels causing the disk gangs to bounce up and down during transportation renders the propelling of the vehicle difficult and frequently results in damage to the implement parts. Since this is due to the necessity of allowing the tool-carrying frame to swing vertically relative to the hitch frame 18, stabilizing means indicated at 57 is provided for holding the implement level during transport by preventing relative pivoting between the hitch frame and the tool-carrying frame, while accommodating the relative vertical movement thereof during operation.

An arm 58 is affixed to and projects upwardly from crank arm 36. The upper end of arm 58 is bifurcated to receive a pin 59 upon which is pivotally mounted the rear end of a flexible thrust rod 60, the rear end of which is bent downwardly and the forward portion of which extends longitudinally generally parallel to the ground and to the direction of travel of the implement. Rod 60 slidably engages a guide 61 comprising a pair of vertically spaced rollers 62 mounted on pins 63 carried between the upper ends of a pair of laterally spaced standards 64 having a right angled base 65 affixed to an extension 66 of the forward end of frame bar 11 of the tool carrier 10.

As shown in Figure 3, the forward portion of rod 60 extends beyond guide 61 and overhangs the rear portion of hitch frame 18. The forward end of rod 60 is pivotally connected to the upper end of a generally vertically extending link 67, adjustable in length, the lower end of wich is pivotally connected to the bar 19 of hitch frame 18. Link 67 preferably comprises a pair of threaded members 68 and 69 connected by a threaded sleeve 70. It will be observed that in Figure 3 the implement is in its operating position and a part of the rod 60 extends beyond the guide 61. Thus the portion of rod 60 between guide 61 and link 67 is flexible, the rollers 62 serving as fulcrums providing support for the rod in a vertical plane to allow this portion of the rod to flex as indicated in dotted lines in Figure 3 to accommodate vertical movement of the tool-carrying frame 10 relative to the hitch frame 18 about the axis of pivot members 33.

The tool-carrying frame 10 is automatically locked against swinging about the pivots 33 relative to hitch frame 18 when the implement is raised to the transport position of Figures 2 and 4, by the rearward shifting of rod 60 until the connection of its forward end to the upper end of link 67 is so closely adjacent the rollers 62 of guide 61 that no flexing can occur and link 67 rigidly holds the hitch frame 18 against pivoting and likewise holds the tool frame 10 so that the disk gangs 16 and 17 are maintained level during transport. Adjustment can be made in the position of the hitch frame 18 relative to tool frame 10 by lengthening or shortening link 67.

The rollers 62 of guide 61 are vertically spaced a distance substantially equal to the diameter of rod 60 so that there can be no vertical play therebetween in the operating or transport positions of the implement.

It is believed that the operation of the stabilizing apparatus of this invention will be clearly understood from the foregoing description. It should likewise be understood that the invention has been described only in its preferred embodiment and that modifications may be made therein without departing from the spirit of the invention or the scope of the appended claims.

What is claimed is:

1. In an implement having a longitudinally extending hitch frame pivotally connected to a draft source for vertical swinging and a tool-carrying frame pivotally connected to the hitch frame for vertical swinging relative thereto in the operating position of the implement, ground engaging wheels mounted on the tool frame for vertical movement relative thereto to vertically move the tool-carrying frame between operating and transport positions, and an operating connection between said wheels and the hitch frame comprising a longitudinally extending rod member operatively connected at its rear end to said wheels and extending forwardly generally parallel to said tool frame, a guide member on the tool frame engageable with said rod medially of its ends to provide support therefor in a vertical plane and prevent vertical movement thereof, said rod having a portion thereof extending forwardly beyond the guide and above the hitch frame in the operating position of the implement and a pivoted link connecting the forward end of said rod to the hitch frame, the portion of said rod extending forwardly beyond said guide in the operating position of the implement being flexible to accommodate vertical swinging of the hitch frame relative to the tool frame.

2. In an implement having a longitudinally extending hitch frame pivotally connected to a draft source for vertical swinging and a tool-carrying frame pivotally connected to the hitch frame for vertical swinging relative thereto, ground engaging wheels mounted on the tool frame for vertical movement relative thereto to raise and lower the frame, a longitudinally swingable arm mounted on the tool frame operatively connected to said wheels to raise and lower the frame, a lever pivoted on the hitch frame, a longitudinally extending flexible link connected at its ends to said arm and said lever and movable longitudinally therewith, and a fixed guide member mounted on the frame engageable with said link between the ends thereof to hold it against vertical movement, said arm and said lever being swingable rearwardly, upon raising the tool frame, to a position with the connection of said link to said lever substantially abutting said guide, whereby the hitch frame is held against pivoting relative to the tool frame, said lever being swingable forwardly when the tool frame is lowered to its operating position to provide a length of said flexible link between the lever and the guide sufficient to accommodate vertical swinging of the hitch frame relative to the tool frame.

3. The invention set forth in claim 2, wherein said link is a solid flexible rod and in the operating position the portion of said rod between said lever and said guide serves as a spring yieldably resisting the relative pivoting of the hitch and the tool frame.

4. The invention set forth in claim 3, wherein said guide includes a pair of vertically spaced rollers so spaced as to slidably receive and confine said rod therebetween against vertical movement and to provide a fulcrum for the flexing of the forward end of the rod.

5. In a disk harrow wherein a pair of longitudinally spaced disk gangs are mounted on a tool-carrying frame and a longitudinally extending hitch frame is pivotally connected at its rear end to the tool frame on a transverse axis, a wheel-carrying crank axle mounted on the frame between the disk gangs for swinging in a vertical plane relative to the tool frame to vertically move the latter between operating and transport positions, an arm affixed to said crank axle and rockable longitudinally upon swinging said axle, a lever pivoted on the hitch frame, a flexible thrust rod connecting said arm to said lever to transmit to the latter the longitudinal movement of the former, and a guide member on the tool frame slidably engaging said rod at a location spaced rearwardly from the latter's connection to said lever when the harrow is in its operating position to provide support therefor in a vertical plane and prevent vertical movement thereof, the portion of said rod in advance of said guide in the operating position of the harrow being capable of flexing vertically relative to said guide to accommodate vertical pivoting of the hitch frame about said transverse axis.

6. The invention set forth in claim 5, wherein upon swinging said wheel-carrying crank axle downwardly to raise the tool frame to transport position said thrust rod moves rearwardly and the connection thereof to said lever shifts to a location closely adjacent said guide whereby said lever functions as a brace to hold the hitch frame against pivoting relative to the tool frame.

7. Stabilizing apparatus for an implement having a tool-carrying frame, a hitch frame connected thereto for vertical pivoting and ground engaging wheel means mounted on the tool frame for vertical movement relative thereto between operating and transport positions of the implement, comprising a longitudinally extending thrust rod, flexible in a vertical plane and operatively connected at its rear end to said wheel means to shift said rod forwardly upon movement of the wheel means to a position corresponding to the operating position of the implement and rearwardly upon raising thereof, a fulcrum member mounted on the forward end of the tool frame and engageable with said rod to provide support therefor in a vertical plane and prevent vertical movement thereof and to provide an overhang of a portion of said rod forwardly of said fulcrum member generally parallel to a portion of the hitch frame in the operating position of the implement, a link connecting the forward end of said rod to the hitch frame to accommodate flexing of the overhanging end of said rod in response to pivoting of the hitch frame in the operating position of the implement, said rod being translationally shiftable rearwardly, upon raising the implement, to a position with the forward end of said rod adjacent said fulcrum member with substantially no overhang.

8. The invention set forth in claim 7, wherein said fulcrum member comprises a pair of vertically spaced rollers adapted to slidably receive and confine said rod therebetween.

References Cited in the file of this patent
UNITED STATES PATENTS

| | | |
|---|---|---|
| 1,238,969 | Weaver | Sept. 4, 1917 |
| 2,320,742 | Newkirk | June 1, 1943 |
| 2,458,091 | Moore | Jan. 4, 1949 |
| 2,580,100 | Johansen et al. | Dec. 25, 1951 |
| 2,669,818 | Pursche | Feb. 23, 1954 |
| 2,869,305 | Murray | Jan. 20, 1959 |